(12) United States Patent
Trinidad et al.

(10) Patent No.: US 8,280,022 B1
(45) Date of Patent: Oct. 2, 2012

(54) CALLING PARTY NUMBER SELECTION FOR CALL CENTER CALLS

(75) Inventors: Juderic Trinidad, Atlanta, GA (US); Theodore Ray Abbott, II, Suwanee, GA (US); Ruby Amastha Fields, Smyrna, GA (US)

(73) Assignee: Noble Systems Corporation, Atlanta, GA (US)

( * ) Notice: Subject to any disclaimer, the term of this patent is extended or adjusted under 35 U.S.C. 154(b) by 0 days.

(21) Appl. No.: 13/459,769

(22) Filed: Apr. 30, 2012

(51) Int. Cl.
*H04M 3/42* (2006.01)

(52) U.S. Cl. ......... 379/201.01; 379/220.01; 379/221.01; 379/142.06

(58) Field of Classification Search .......... 379/201.01–201.03, 220.01, 221.01, 379/142.06, 265.01
See application file for complete search history.

(56) References Cited

U.S. PATENT DOCUMENTS

| | | | |
|---|---|---|---|
| 5,095,505 A | 3/1992 | Finucane et al. | |
| 5,274,699 A | 12/1993 | Ranz | |
| 5,283,824 A | 2/1994 | Shaw | |
| 5,590,184 A | 12/1996 | London | |
| 5,740,538 A | 4/1998 | Joyce et al. | |
| 5,784,444 A | 7/1998 | Snyder et al. | |
| 5,864,612 A | 1/1999 | Strauss et al. | |
| 5,901,209 A | 5/1999 | Tannenbaum | |
| 6,130,935 A | 10/2000 | Shaffer et al. | |
| 6,343,120 B1 | 1/2002 | Rhodes | |
| 6,449,351 B1 | 9/2002 | Moss et al. | |
| 6,643,363 B1 | 11/2003 | Miura | |
| 6,661,882 B1 | 12/2003 | Muir et al. | |
| 6,662,006 B2 | 12/2003 | Glass | |
| 6,684,336 B1 | 1/2004 | Banks et al. | |
| 6,831,974 B1 | 12/2004 | Watson et al. | |
| 6,876,736 B2 | 4/2005 | Lamy et al. | |
| 6,941,159 B2 | 9/2005 | Tsai et al. | |
| 7,020,256 B2 | 3/2006 | Jain et al. | |
| 7,099,445 B2 | 8/2006 | Creamer et al. | |
| 7,170,983 B2 | 1/2007 | Gruchala et al. | |
| 7,280,646 B2 | 10/2007 | Urban et al. | |
| 7,899,169 B2 * | 3/2011 | Siminoff | 379/201.01 |
| 8,135,122 B1 * | 3/2012 | Siminoff | 379/201.01 |
| 2002/0018547 A1 | 2/2002 | Takae et al. | |
| 2002/0044638 A1 | 4/2002 | Gruchala et al. | |
| 2002/0080942 A1 | 6/2002 | Clapper | |
| 2002/0145624 A1 | 10/2002 | Szlam et al. | |
| 2002/0146111 A1 | 10/2002 | Hayashi | |
| 2003/0147519 A1 | 8/2003 | Jain et al. | |
| 2003/0174825 A1 * | 9/2003 | Aldridge et al. | 379/207.15 |
| 2004/0017899 A1 | 1/2004 | Garfinkel et al. | |

(Continued)

OTHER PUBLICATIONS

Maestro 2010.1.1 User Manual, vol. 1, Aug. 17, 2010, 454 pages, Noble Systems Corporation, Atlanta, GA.

(Continued)

*Primary Examiner* — Joseph J Nguyen

(57) ABSTRACT

A call center maintains various pools of telephone numbers, where each telephone number pool comprises a plurality of telephone numbers in a geographic area. A call originating to a called number uses a calling telephone number that is selected from one of a plurality of telephone number pools based on the area designated by the called number. An index value is used to select the telephone number from the selected telephone number pool. The selected telephone number is used to as a calling telephone number when originating a call to the called party.

13 Claims, 6 Drawing Sheets

U.S. PATENT DOCUMENTS

| | | | |
|---|---|---|---|
| 2004/0101123 A1 | 5/2004 | Garcia | |
| 2004/0266415 A1 | 12/2004 | Belkin et al. | |
| 2007/0064895 A1 | 3/2007 | Wong et al. | |
| 2007/0127703 A1* | 6/2007 | Siminoff | 379/372 |
| 2007/0263819 A1 | 11/2007 | Finkelman et al. | |
| 2007/0263853 A1* | 11/2007 | Pearson et al. | 379/413.03 |
| 2008/0089501 A1 | 4/2008 | Benco et al. | |

OTHER PUBLICATIONS

Maestro 2010.1.1 Manual, vol. Two: Daily Management, Aug. 3, 2010, 416 pages, Atlanta GA 30319.

Rootsecure.net, downloaded from Web on Apr. 26, 2012, two pages, http:www.rootsecure.net/?p=reports/callerid_spoofing.

* cited by examiner

CALLING PARTY NUMBER SELECTION FOR CALL CENTER CALLS

BACKGROUND

Call centers are frequently retained by an enterprise to contact the enterprise's customers. One common application involves contacting customers having a credit account with, or loan from, the enterprise having a past due balance. The call center may contact the customer to discuss an outstanding balance, payment terms, etc. Such calls are sometimes referred to as "debt collection" calls. In many cases, the call center may repeatedly call the customer.

The common availability of caller-identification ("caller-ID") technology allows the called party to see the calling number for an incoming call before the call is answered. The calling number is sometimes referred to as the ANI ("automatic number identification) based on the capability that delivered the calling party telephone number. For purposes herein, the ANI and calling party number are assumed to have the same meaning.

As can be expected, called parties often attempt to avoid answering debt collection calls. Caller-ID technology, as well as other services that block calls from a specified originating telephone number, can impede the communication between the call center and the called party. Using the same ANI value for repeated debt collection calls allows the called party to readily identify the call as a debt collection call. Furthermore, if an out-of-region ANI is presented to the called party, the called party may be hesitant to answer the call as compared to a call having a local ANI. Furthermore, if the ANI is out of region, the called party may be more hesitant to return the call, since long distance charges may be involved.

It is with respect to these and other considerations that the disclosure herein is presented.

BRIEF SUMMARY

Technologies are generally presented herein pertaining to selecting an ANI to use in originating an outbound call from a call center. In one embodiment, the calling party number is selected from a pool of calling party numbers allocated for an area that is local to the called party. The calling party number can be selected from the pool of local numbers by using various algorithms. This results in using different numbers from the pool when calling individuals in a particular area.

The subject matter disclosed herein may be implemented as a computer-controlled apparatus, a computer process, a computing system, or as an article of manufacture such as a computer readable storage medium. These and various other features will be apparent from the following Detailed Description and the associated drawings.

This Summary is provided to exemplify concepts at a high level form that are further described below in the Detailed Description. This Summary is not intended to identify key or essential features of the claimed subject matter, nor is it intended that this Summary be used to limit the scope of the claimed subject matter. Furthermore, the claimed subject matter is not limited to implementations that address any or all disadvantages noted in any part of this disclosure.

BRIEF DESCRIPTION OF THE SEVERAL VIEWS OF THE DRAWINGS

Reference will now be made to the accompanying drawings, which are not necessarily drawn to scale, and wherein.

DETAILED DESCRIPTION

Figure 1:
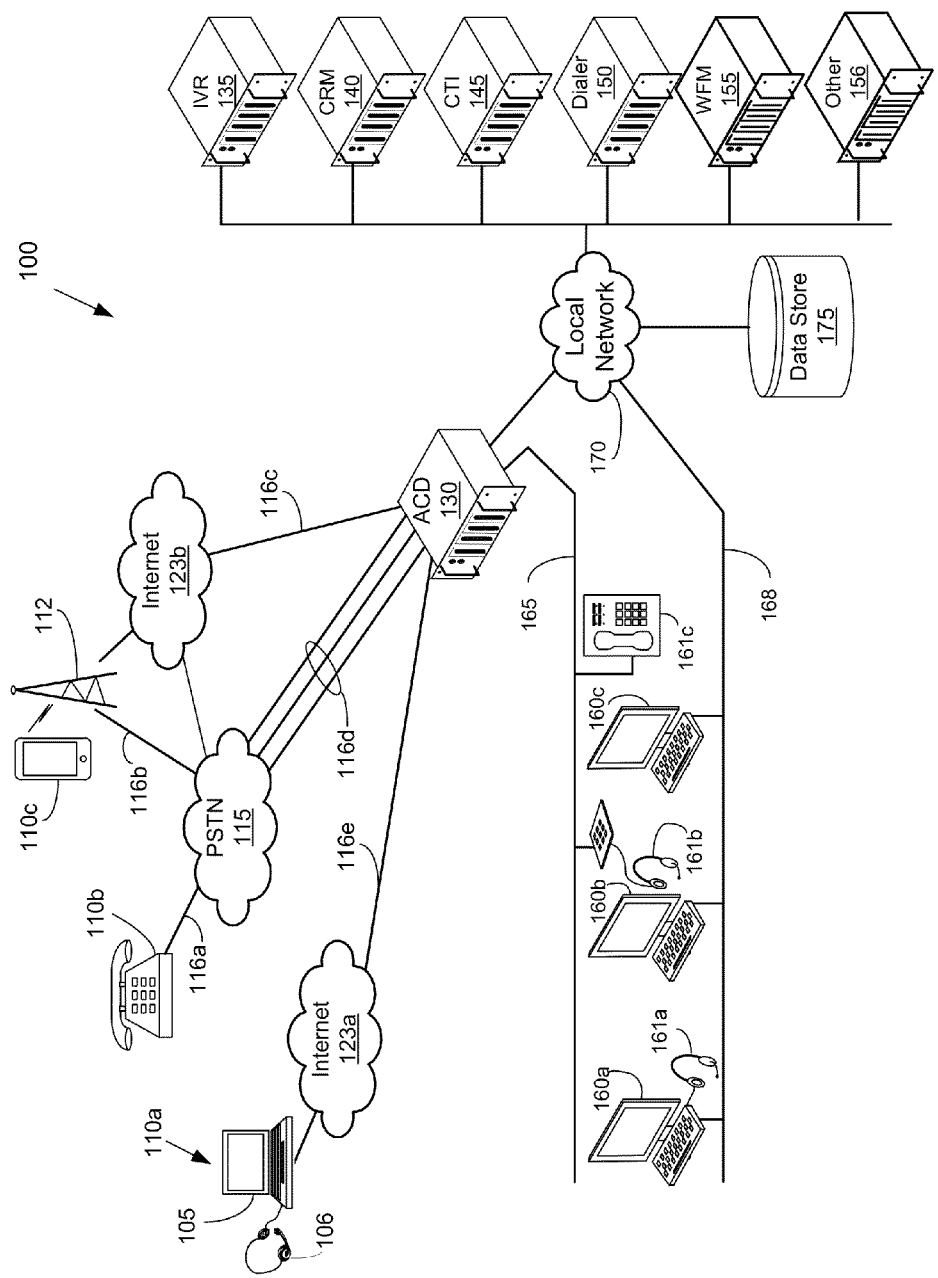
FIG. 1 shows one embodiment of a call center architecture illustrating the various technologies disclosed herein.

Various embodiments for practicing the technologies disclosed herein are described more fully hereinafter with reference to the accompanying drawings, in which some, but not all embodiments of the technologies disclosed are shown. Indeed, the embodiments disclosed herein are provided so that this disclosure will satisfy applicable legal requirements and should not be construed as limiting or precluding other embodiments applying the teachings and concepts disclosed herein. Like numbers in the drawings refer to like elements throughout.

It is common for the ANI to be displayed to the called party using various caller-ID technologies, which indicates the telephone number of the calling party (the call center). In various circumstances, a called party may view the ANI and choose not to answer the phone. The called party may recognize a telephone number that is not local, and decide not to answer the call. If a message is left, the called party may not return the call because long distance charges may be incurred. Alternatively, the called party may recognize the ANI as being associated with a debt collection call.

The current disclosure generally pertains to selecting an ANI for a call originating from a call center to a called party. The ANI used in originating the call can be selected from a pool of local telephone numbers ("TN"). These numbers, when dialed, route the call back to the call center, which may be located in another area. The ANI numbers selected from this TN pool can be rotated so that the called party is presented with a varying local number on different calls. Each call appears to be from a local number, and may not be associated by the called party as being a debt collection call. Further, the enterprise may periodically "refresh" the pool with local numbers after they become recognized by the called party and associated with a debt collection call.

Exemplary Call Center Architecture

FIG. 1 shows one embodiment of a call center architecture 100 illustrating the various technologies disclosed herein. The call center shown in FIG. 1 may process voice calls that are inbound-only, outbound-only, or a combination of both (sometimes referred to as a "blended" call center). Although many aspects of call center operation is disclosed in the context of voice calls, the call center may process other forms of communication such as facsimiles, emails, text messages, video calls, chat messages, and other forms. Since the call center may handle calls originating from a calling party, or initiated to a called party, the term "party" without any further qualification refers to a person associated with a call processed by the call center, where the call is either received from or placed to the party. The term "caller," if used, will generally refer to a party calling the call center, but in many cases this usage is exemplary. Thus, use of the term "caller" is not intended to limit the concepts to only inbound calls unless the context dictates such.

Inbound voice calls may originate from calling parties using a variety of phone types. A calling party may originate a call from a conventional analog telephone 110*b* connected to a public switched telephone network ("PSTN") 115 using an analog plain old telephone service ("POTS") line 116*a*. The calls may be routed by the PSTN 115 and may comprise various types of facilities 116*d*, including, but not limited to: T1 trunks, SONET based fiber optic networks, ATM networks, etc. Various types of routers, switches, bridges, gateways, and other types of equipment may be involved in the processing of a call.

Inbound voice calls may also originate from a mobile device 110*c*, such as a smart phone or tablet, which wirelessly communicates with a mobile service provider ("MSP") 112. The voice calls may be routed to the PSTN 115 using an integrated services digital network ("ISDN") interface 116*b* or other types of interfaces that are well known to those skilled in the art. The MSP 112 may also route calls as packetized voice, referred to herein as voice-over-IP ("VoIP") to an Internet provider 123*a* using Internet-based protocols. For convenience, unless indicated otherwise, the term "trunk" refers to any type of facility 116*c*, 116*d*, or 116*e* providing voice calls to, or from, the call center, regardless of the type of protocol or technology used. Specifically, a "trunk" is not limited to time-division multiplexing ("TDM") technology.

Voice calls may also originate from a calling party employing a so-called "IP phone," "VoIP phone," or "soft phone" 110*a*. In one embodiment, this device may comprise a computing device 105, such as a laptop or computing tablet, which interfaces with a headphone/microphone combination, also referred to as a "headset" 106. An IP phone may use a digital voice control protocol and may process packetized voice data according to various Internet based voice protocols, such as session initiated protocol ("SIP"). The call may be conveyed by other types of Internet providers 123*a*, such as a cable company providing Internet access services over a coaxial cable facility 116*e*. Those skilled in the art will recognize that a variety of protocols and facilities may be used to convey voice calls.

The term "telephone call" as used herein is generally synonymous with a "voice call" unless indicated otherwise. Further, the term "telephone call" may encompass a voice call originating from any type of device, such as a soft phone 110*a*, conventional telephone, 110*b*, a mobile device 110*c*, or other device known in the art. The term "call" as used herein may mean an active instance of two-way communication, an attempt to establish two way communication, or a portion of the two-way communication. For example, a user at a conventional telephone 110*b* can dial a telephone call in an attempt to establish two-way communication, and a call can be said to exist even prior to establishment of a two-way connection. In another example, a call may be put on hold, and a portion of the call may be referred to as a "call leg" existing between the caller and certain equipment. A call may comprise a number of concatenated call legs, as known to those skilled in the art. In certain contexts, which will be made explicit, the call may encompass communications other than voice, e.g., text, email, video chat, facsimile, etc.

Inbound calls from callers to the call center may be received at an automatic call distributor ("ACD") 130. The ACD 130 may be a specialized switch for receiving and routing inbound calls under various conditions. The ACD 130 may be embodied as a dedicated form of equipment readily available from various manufacturers, or the ACD 130 can be a so-called "soft switch" comprising a suitable programming module executed by a processing device to perform the necessary functions. The ACD 130 may route an incoming call over call center facilities 165 to an available agent. The facilities 165 may be any suitable technology for conveying the call, including but not limited to a local area network ("LAN"), wide area network ("WAN"), ISDN, or conventional TDM circuits. The facilities 165 may be the same or different from the facilities used to transport the call to the ACD 130.

Calls may be routed over facilities 165 to an agent for servicing. That is, the party may speak with an agent for receiving, for example, customer service. The physical area at which the agent sits is often referred to as an agent "position" and these positions are often grouped into clusters that are managed by a supervisor, who may monitor calls and the agents' productivity. An agent usually uses a computing device, such as a computer 160*a*-160*c* and a voice device 161*a*-161*c*. The combination of computer and voice device may be referred to as a "workstation." Thus, the workstation collectively has a data capability and a voice capability, though separate devices may be used. In some instances, "workstation" may be used in reference to either the data or voice capability at the agent's position. For example, "routing the call to the agent's workstation" means routing a call to one of the voice devices 161*a*-161*c* at the agent's position. Similarly, "routing the call to the agent" means routing a call to the appropriate equipment at an agent's position.

The voice device used by an agent may be a soft phone device exemplified by a headset 161*a* connected to the computer 160*a*. The soft phone may be virtual telephone implemented in part by an application program executing in a computer. The phone may also comprise an Internet Protocol ("IP") based headset 161*b* or a conventional phone 161*c*. Use of the term "phone" is intended to encompass all these types of voice devices used by an agent, unless indicated otherwise.

An agent typically logs onto their workstation prior to handling calls. This allows the call center to know which agents are available for handling calls. The ACD 130 may also maintain data of an agent's skill level that is used to route a specific call to the agent, or group of agents having the same skill level. If a suitable agent is not available to handle a call, the ACD 130 may queue the call for the next available agent. As can be expected, various algorithms may be employed to process calls in an efficient manner.

Two types of signaling information may be provided with the inbound call that the ACD 130 uses in processing the call. The first type of signaling information indicates the telephone number dialed by the caller, and is frequently referred to as "DNIS," derived from the Dialed Number Identification Service associated with this capability. A call center may provide various services, such as sales, customer service, technical support, etc., each of which may be associated with a different telephone number (e.g., multiple toll free "800" numbers). The DNIS can be used by the ACD 130 to determine the purpose of the call, and potentially identify a group of agents having the appropriate skill level to handle the call. The ACD 130 may prioritize and route calls to an agent based on the required skill level. Skills-based routing may be a rule-based set of instructions that the ACD 130 uses to handle calls. Skills-based routing may be implemented by the ACD 130, or by the ACD 130 interacting with a computer-telephone integrated ("CTI") server 145.

The CTI server 145 may be incorporated in a call center to control and/or coordinate other components of the call center architecture 100. Specifically, the CTI server may interact with the ACD 130 to coordinate call processing. Thus, in some embodiments, the CTI server 145 may control the routing of calls from the ACD 130 to the various agent workstations and/or provide data to other components processing the call. The CTI server 145 may also provide call reporting functionality based on data collected during calls.

The second type of signaling information that may be provided with an inbound call is the calling telephone number, often referred to as automatic number identification or "ANI." In one configuration, the ACD 130 and/or CTI server 145 may use the ANI of an incoming call to retrieve caller information from a data store 175 and provide the data to the agent's workstation computer along with routing the call to the agent's workstation phone. For example, the ANI can also be used to ascertain a party's status (e.g., a "Gold Level" customer warranting premium service), to facilitate the ACD 130 routing the call to a select group of agents. The data store 175 can be a database storing records of caller information. The data store 175 can be integrated with the CTI server 145, the ACD 130, or segregated as a standalone database. Thus, the call and associated call data are presented at the agent's headset 161b and their computer 160b.

The ACD 130 may place a call in a queue if there are no suitable agents available, or it may route the call to an interactive voice response server ("IVR") 135 to play voice prompts. These prompts may be in a menu type structure and the IVR 135 may collect and analyze responses from the party in the form of dual-tone multiple frequency ("DTMF") tones and/or speech. The IVR 135 may be used to further identify the purpose of the call to the CTI server 145, such as prompting the party to enter account information, or otherwise obtain information used to service the call. The IVR 135 may interact with other servers, such as the CTI server 145 or the data store 175, in order to retrieve or provide information for processing the call. In other configurations, the IVR 135 may be used to only provide announcements.

The interaction between the ACD 130, IVR 135, CTI server 145, agent computers 160a-160c, as well as other components, may involve using a local area network ("LAN") 170. Other configurations are possible, such as, but not limited to, using a wide area network, wireless network, router, bridge, direct point-to-point links, etc.

When an agent is interacting with a called or calling party, the agent may use their workstation computer 160b to further interact with other enterprise computing systems, such as a customer relationship management ("CRM") server 140. A CRM server 140 may be used to integrate information from various enterprise business systems to facilitate the agent servicing the call. A variety of applications may be provided by a CRM server 140.

In addition to receiving inbound communications, including voice calls, emails, and facsimiles, the call center may also originate communications to a called party, referred to herein as "outbound" communications. In some embodiments, a call center may employ a dialer 150, such as a predictive dialer, to originate outbound calls on behalf of an agent at a rate designed to meet various criteria. Similar to the other components within the call center architecture 100, the dialer 150 may comprise a software module executing on processing device hardware platform.

The dialer 150 is typically configured to dial a list of telephone numbers to initiate outbound calls, which can be accomplished in one embodiment by instructing the ACD 130 to originate calls. In some embodiments, the ACD may include functionality for originating calls, and if so, this component may be referred to as a private automatic branch exchange ("PBX" or "PABX"). In other embodiments (not shown), the dialer 150 may directly interface with voice trunks using facilities 116c, 116d to the PSTN 115 for originating calls. After the calls are originated, a transfer operation by the ACD 130 or the dialer 150 may connect the call with an agent, or place the call in a queue for an available agent. In the latter case, announcements or music may be provided to the party. In various embodiments, the dialer 150 may make use of one or more algorithms to determine how and when to dial a list of numbers so as to minimize the likelihood of a called party being placed in a queue while maintaining target agent utilization.

Another server that may be employed in a call center is a workforce management ("WFM") server 155. This server maintains information to generate agent's schedules to effectively handle inbound/outbound calls. The WFM server 155 may maintain historical call volume information for call campaigns and forecast expected call volume to predict the number of agents needed to handle the call volume at a defined service level. The WFM server 155 can then apply information about available agents to then generate a work roster of agents. In other words, the WFM server 155 schedules agents for their work shifts according to the anticipated needs of the call campaigns.

Finally, in various embodiments, the call center architecture 100 may include another server 156 to perform various functions. For example, the server 156 could be a quality assurance system that records communication fielded by an agent or allows a manager to monitor a voice session to ensure calls are being handled correctly.

Although the above components are referenced as "servers," each may be also referred to in the art as "units" or "system." A server may incorporate a local data store, database, or interface with an external database. Use of the word "server" does not require the component to interact in a client-server arrangement with other components, although that may be the case. Further, the above components may be located remotely from (or co-located with) other components. Furthermore, one or more of the components may be implemented on a single processing device to perform the functions described herein. For example, in various embodiments, one or more functionalities of the ACD 130, the IVR server 135, the CRM server 140, the CTI server 145, and/or the dialer 150 may be combined into a single hardware platform executing one of more software modules. In addition, the call center architecture 100 may be provided as a hosted solution, where the call processing functionality is provided as a communication service (a so-called "communication as a service" or "CaaS") to a call center operator. Thus, there is no requirement that the servers identified above actually be located or controlled by a call center operator.

In addition, the agent positions can be co-located in a single physical call center multiple physical call centers. The agents can be remotely located from the other components of the call center, and may also be remotely located from each other, sometimes referred to as a "virtual call center." A virtual call center may describe a scenario where agents work at home, using their own computers and telephones as a workstations. In some configurations, a single physical location of the call center may not be readily identifiable. This may occur when the call processing functions are provided as a service in a hosted cloud computing environment and the agents positions are in their individual residences.

Those skilled in art will recognize FIG. 1 represents one possible configuration of a call center architecture 100, and that variations are possible with respect to the protocols, facilities, technologies, and equipment used. For example, various algorithms and queuing arrangements may be defined to efficiently process calls. In other configurations, the ACD 130 may be configured to process not only voice calls, but also other forms of communication, and perform corresponding call processing functions for email, text, or facsimile calls. Alternatively, a web server (not shown in FIG. 1) may receive or originate email and text communications, as well as interact with other call center components.

ANI Scrambling

For purposes of reference herein, a telephone number is presumed to be a ten digit number that is formatted as: NPA-NXX-XXXX. The NPA is the numbering plan area, or more commonly referred to as an area code. The NXX may be referred to as a central office code (which originated with wireline telephone switches located in a central office) or a prefix code. Since many communication services involve mobile users, the NXX will simply be referred to as the NXX code. The last four digits, XXXX, may be referred to as the subscriber or line number.

In many telecommunications services, such as residential telephone service, the ANI used for a call is determined by the carrier, such as the PSTN. For example, if a residential telephone originates a call, then the telephone number associated with that telephone line is used as the ANI by the PSTN. However, other telecommunication services, such as various business services, allow the originating party to select a particular ANI to be used when originating a call. Thus, the ANI can be selected by the originating party on a per-call basis.

If a default value of the ANI is always used, and the call center is in another area, then the called party may likely recognize the ANI as a debt collection call. Allowing the call center to select an ANI having different values for different calls is referred to herein as "ANI scrambling."

Figure 2:
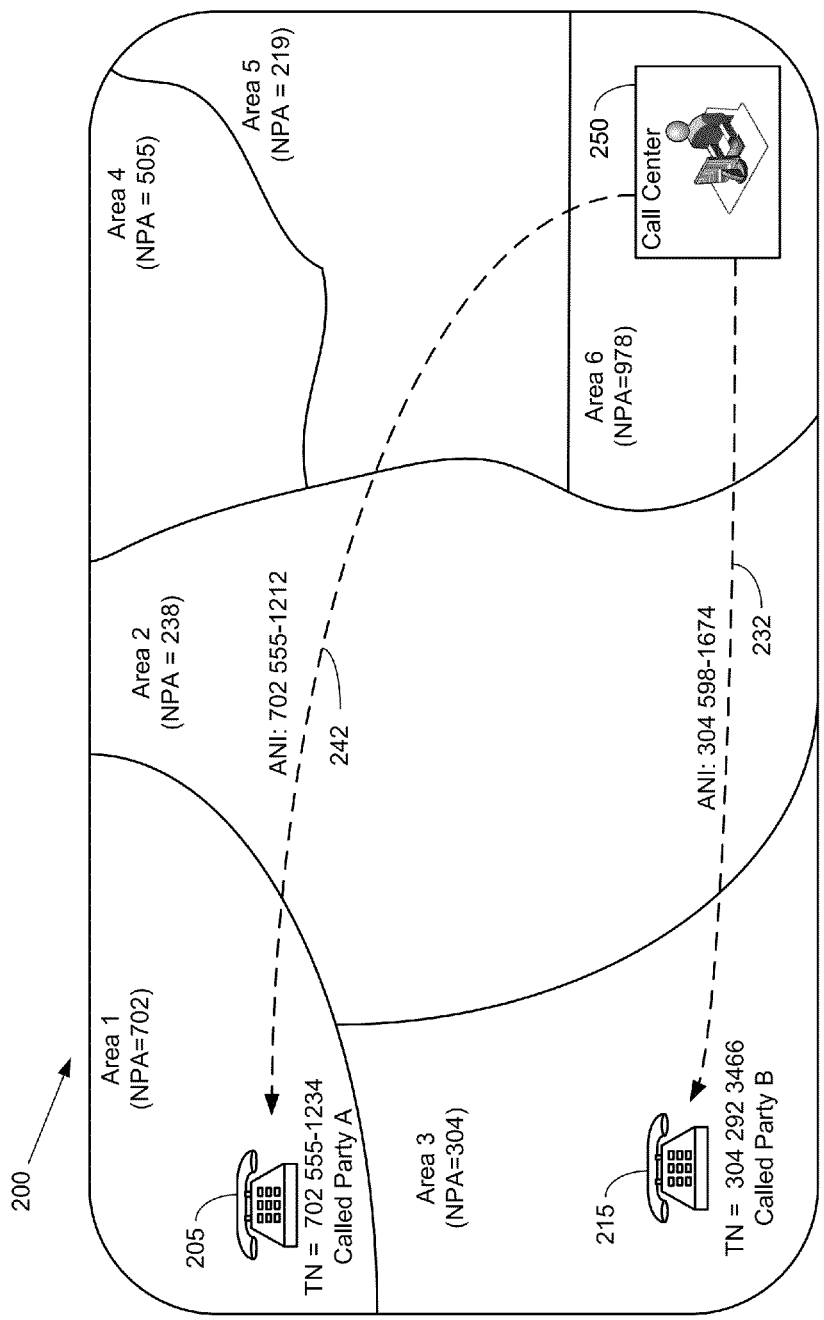
FIG. 2 shows one embodiment of different called areas potentially associated with call originations from a call center.

When selecting the ANI to use, there is a benefit from selecting an ANI that has the same NPA code, and potentially the same NXX code, as the called party number. This can be illustrated in FIG. 2. FIG. 2 shows a geographic map 200 in diagrammatic form that represents various designated areas (or simply "areas"). The areas can represent different areas in a country, region, or a state. Area 1 is associated with a region and is allocated an NPA=702. Area 2 is another region and is allocated with NPA=238. Area 3 is allocated NPA 304. Area 4 is allocated NPA 505, and Area 5 is allocated NPA 219. Finally, Area 6 is allocated NPA 978 and this is the area in which a call center 250 is located.

The NPA codes assigned to the areas shown in FIG. 2 may be actual area codes and may be actually assigned to actual regions, (e.g., NPA 304 is allocated to West Virginia and NPA 702 is allocated to Nevada). However for purposes of illustration, the areas designated with an NPA code are for exemplary purposes. Specifically, FIG. 2 shows that Area 1 and Area 3 share a common border, but in reality West Virginia does not share a common border with Nevada. The reader will understand that FIG. 2 is for exemplary purposes and is for illustrating the concepts of the technologies.

In FIG. 2, the call center 250 may attempt to originate a call to Called Party A 205 having a telephone number ("TN") of 702-555-1234. The call center originating the call is in Area 6 and may have an ANI that includes NPA=978. Specifically, for purposes of illustration, the call center may be assigned a telephone number of 978-295-5555. However, originating a call using that telephone number as the ANI will result in the called party seeing the corresponding ANI of 978-295-5555. In other instances, the call center may be located outside the U.S., and the area code or number could be recognized by the called party as being outside the U.S.

In either case, the Called Party A may recognize the out of region NPA as being associated with a debt collection call. Further, Called Party A may be hesitant to return the call, since it is an out of region area code, and it may result in long distant charges. This would be especially likely if the ANI was for a telephone number based outside the U.S. It would be preferable for the ANI to have the same area code as the called party, and potentially with the same NXX code as the called party. Specifically, the call 242 in FIG. 2 could be originated using an ANI of, e.g., 702-555-1212. When the ANI is viewed by Called Party A, the ANI having a NPA-NXX code of 702-555 appears to the called party to be a local call. Called Party A may be more likely to answer the call, or to call back the call center.

Similarly, if the call center 250 is originating a call 232 to Called Party B 215 having a TN of 304-292-3466, then the ANI for that call can be, e.g., 304-598-1674. In this scenario, the NPA is the same (e.g., 304) but the NXX code is different. Nevertheless, Called Party B 215 may presume that the call originated from Area 3, and may be more likely to answer the call or return the call.

Over time, the called party may learn to recognize that the local number (304 598-1674) is associated with a debt collection call. The called party may employ various types of blocking mechanisms that operate on that particular ANI value. Thus, merely using a local number as the ANI by the call center may, over time, not be effective in establishing contact with the called party.

Figure 3:
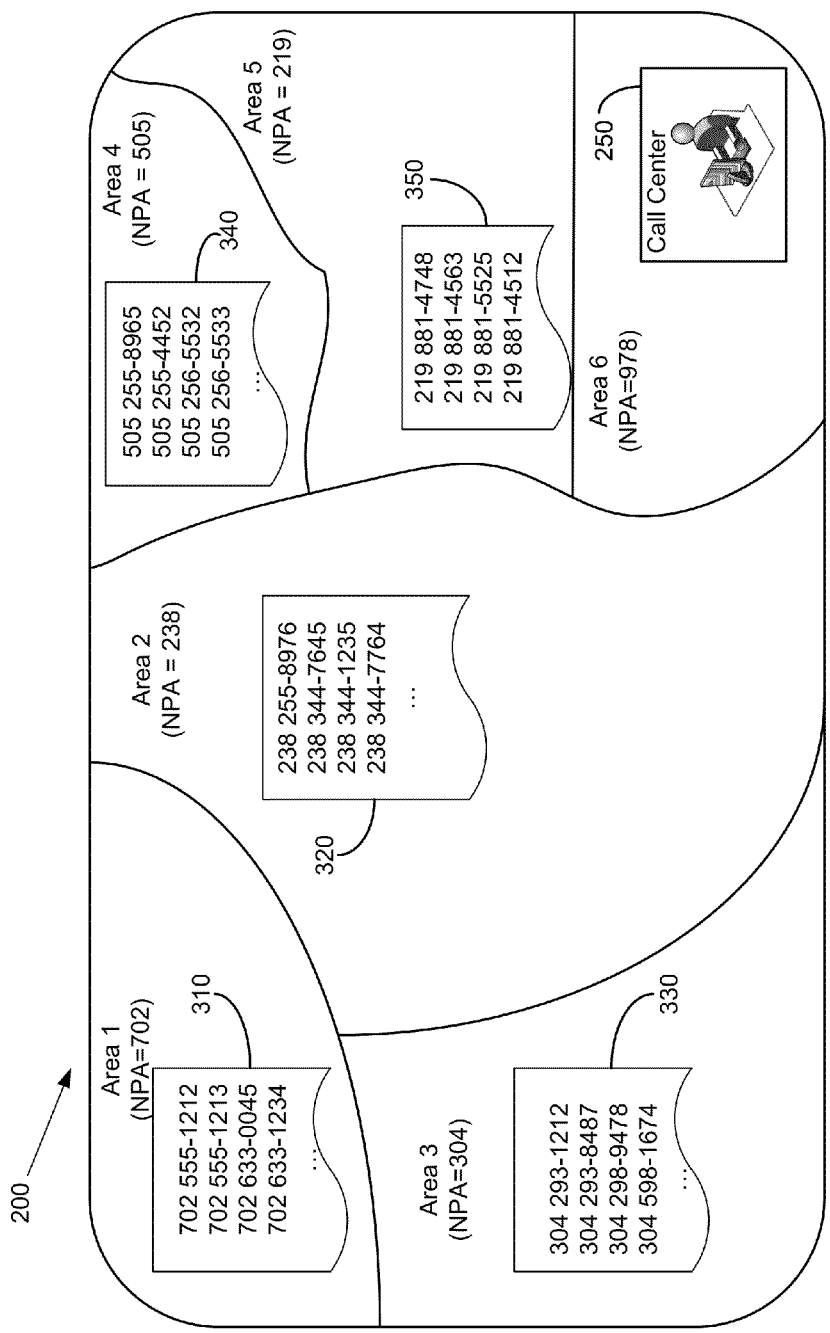
FIG. 3 shows one embodiment of allocating telephone number pools to different called areas.

FIG. 3 illustrates how local TN pools can be used to ensure that various local telephone numbers are rotated in use. In FIG. 3, the map 200 displays the various areas, and each area is associated with a list of numbers (the TN pool) having the same area code as the corresponding area. Specifically, Area 1 is associated with a pool or table 310 of telephone numbers, which includes as a first number 702-555-1212. This is the same area code associated with Area 1. Further, there are two different NXX codes indicated in the table—one for 555 and the other 633. Similar tables are defined for the other areas. Specifically, Area 2 in NPA 238 is associated with a table 320 of local numbers that have a NPA of 238, Area 3 is associated with a table 330 of local number with area code 304, Area 4 in area code 505 is associated with a table 340 with local numbers with the 505 NPA, and Area 5 in area code 219 is associated with a table 350 of local numbers with an NPA of 219.

Turning to Area 5 in greater detail, the local TNs in this tablet 350 all have the same NXX code—881. Each table may have a number of local TNs, and for illustrative purposes, it is assumed that there are ten numbers in each table. In other embodiments, the number of local TNs in the pool may vary on the area population size or the number of anticipated calls to each region, etc. Table 330 has NXX codes 293, 298, and 598. In various embodiments, the number of NXX code may be varied, or the same, based on demographics or other considerations.

The various tables of TN pools 310, 320, 330, 340, 350 are shown in each associated region. In reality, this is merely a logical illustration of how the tables are associated with each area, as the tables are typically stored in the call center, which in this example is located in Area 6. Thus, when the call center 250 originates a call to a called party in Area 2, the call center can select one of the numbers from table 320 as the ANI for that call.

Figure 4:
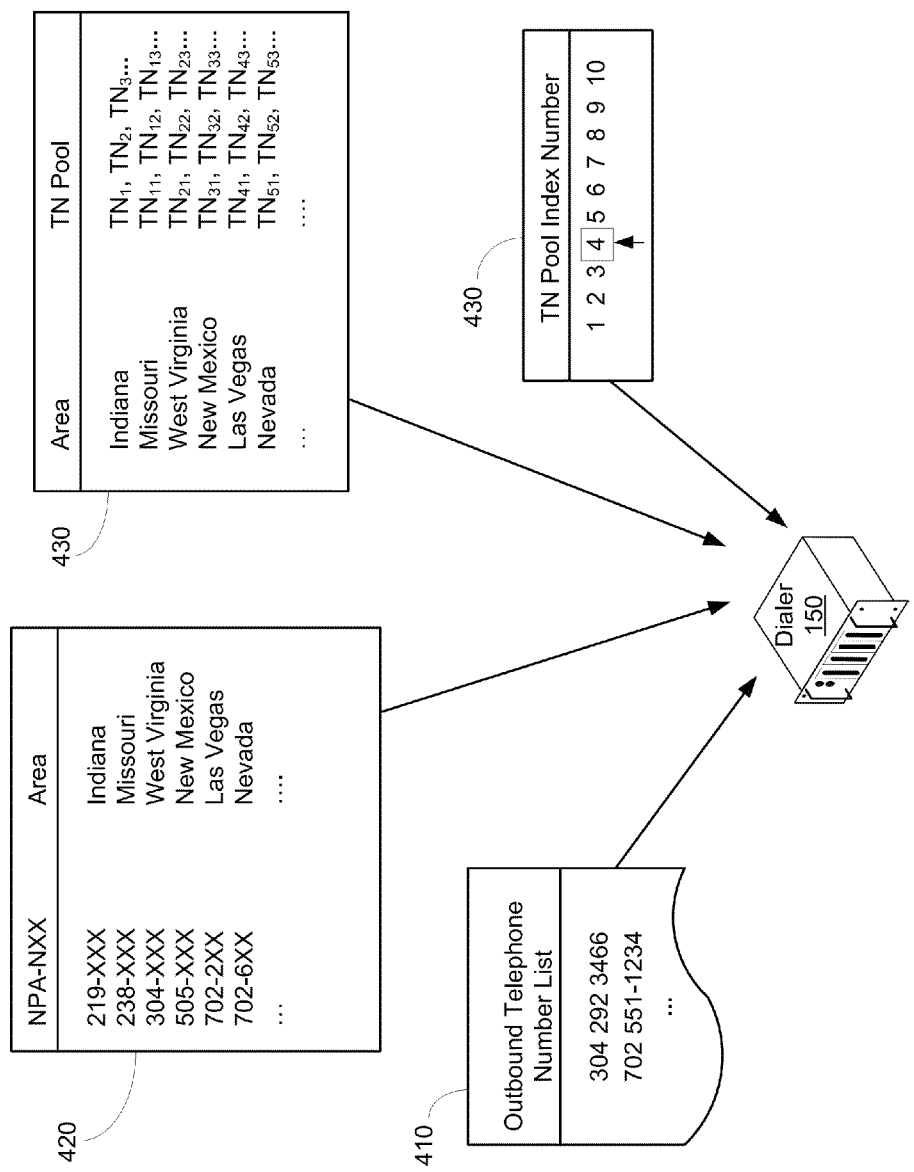
FIG. 4 shows one embodiment of data structures used to select an ANI from a pool of telephone numbers for a particular called area.

When the call center originates the call, it may use a dialer 150. The dialer 150 may employ various algorithms for selecting the ANI number to use from a local TN pool. This is illustrated in FIG. 4. In FIG. 4, the dialer 150 may store or access information in an outbound telephone number list 410. In this embodiment, the first two numbers are 304-292-3466 and 702-551-1234. These correspond to the telephone numbers for Called Party B 215 and Called Party A 205 from FIG. 2. The outbound telephone number list may contain hundreds of telephone numbers, and only two are discussed for purposes of illustrating the principles of the disclosed technologies.

The dialer 150 may also maintain an area mapping table 420. The area mapping table maps a NPA-NXX to an area. In this embodiment, the area is given a text based name corresponding to a state or city. In other embodiments, other nomenclature may be used. For example, zip codes, regional names, metropolitan statistical areas ("MSA") or rural statistical areas ("RSA") designations may be used. In the area mapping table 420, the NPA-NXX codes may incorporate wildcard designators, so that all NXX codes in a NPA area are mapped to the same area. For example, all NXX codes in the 219 area code are mapped to the area "Indiana."

In other embodiments, the NXX codes can be distinguished. For example, the 702 area code (Nevada) may distinguish between calls that are associated with a city (Las Vegas) and the rest of the state. Thus, the 702-2XX codes (e.g., 702-234, 702-255, 702-257, etc.) may be mapped to a city, where as other codes, such as 702-6XX, are mapped to the greater state area. Those skilled in the art will recognize in light of the present disclosure that various approaches can be used to define the area mapping table.

Table 430 is the area-to-TN pool mapping table. The area-to-TN pool identifies a set of local telephone numbers that are associated with the designated area. As noted before, it is assumed for purposes of illustration that there are ten local telephone numbers for each area. Thus, for the Indiana area, there may be ten TNs in the local pool. This could include, e.g., the local TNs from table 350 in FIG. 3, namely the TNs including: 219-881-4748; 219-881-4563; 219-882-5525, etc.

The dialer 150 may also maintain a TN pool index number 430. The TN pool index number is a value that changes over time, and which is used to select a number from the appropriate TN pool. The TN pool index value may be a value that is rotated on a periodic basis. As shown in FIG. 4, the current value is set to 4. This can be incremented or decremented on a daily basis, hourly basis, per call basis, etc. When the value of 10 is reached, it returns back to 1. Thus, the TN pool index value may be a circular index value. If the value is set, e.g., to 4, then the $4^{th}$ TN in the selected TN pool is used for the ANI on the next outgoing call.

In other embodiments, the index value has a maximum value as the same number as the number of telephone numbers in a pool. In other embodiments, each telephone number pool could have a different number of telephone numbers and involve a corresponding, different index number. For example, if a pool had 10 telephone numbers, then the index could have values of 1-10. If another pool had 8 telephone numbers, then another index could be used which has values of 1-8.

Figure 5:
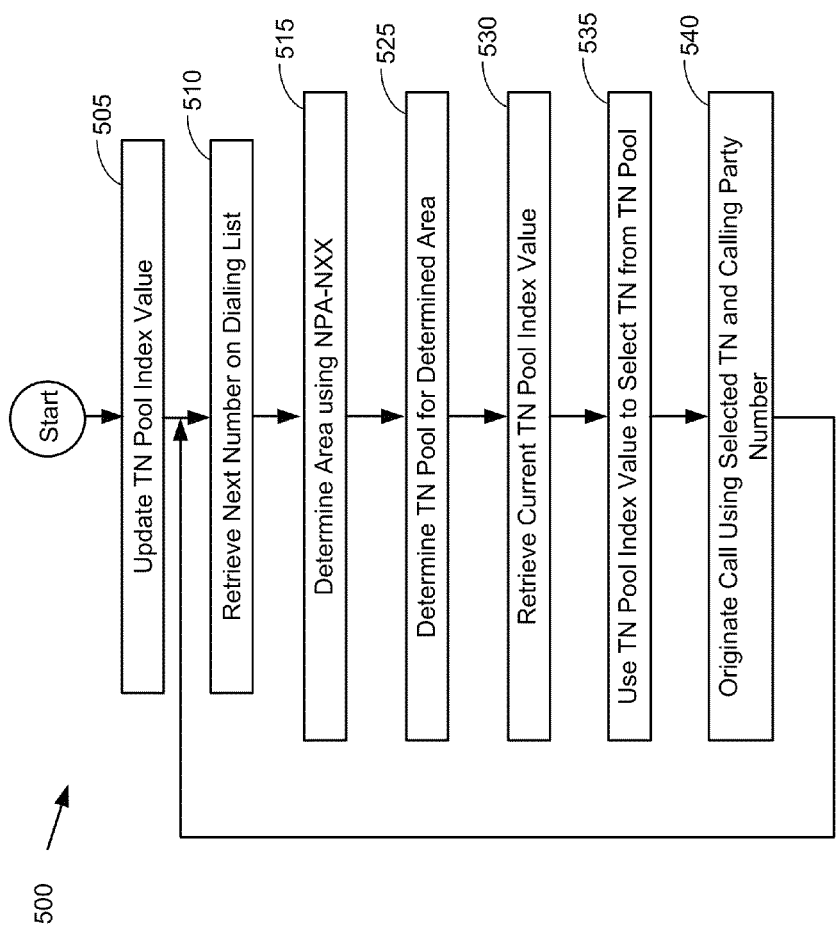
FIG. 5 shows one embodiment of a process flow for selecting an ANI from a telephone number pool to be used when originating a call to a particular called area.

FIG. 5 illustrates the ANI selection process using the above tables in further detail. The logical operations described herein may be implemented as a sequence of computer implemented acts or one or more program modules running on a computing system and/or as interconnected machine logic circuits or circuit modules within the computing system. The implementation is a matter of choice dependent on the performance and other requirements of the computing system. Accordingly, the logical operations described herein are referred to variously as states operations, structural devices, acts, or modules. These operations, structural devices, acts and modules may be implemented in software, in firmware, in special purpose digital logic, and any combination thereof. Additional or fewer operations may be performed than shown in the figures and described herein. These operations may also be performed in a different order than those described herein.

Returning to FIG. 5, the process begins with operation 505 in which the TN pool index value is incremented. This ensures that periodically, the index value, and the ANI is changed. In this manner, whenever calls are made to a region, a different ANI will be used. With respect to FIG. 4, if the TN pool index number table 430 was previously set to the value 3, then this operation would increase it to the value of four as indicated in table 430.

In operation 510, the next number on the dialing list is retrieved. These may be numbers associated with a particular calling campaign. This is the called party telephone number, to which the call is established. Returning back to FIG. 4, the first outbound telephone number in the outbound telephone number list is 304-292-3466.

In operation 515, the process determines the area using the NPA-NXX portion of the outbound telephone number. Using the example of the outbound TN 304-292-3466, the NPA-NXX is 304-292. Examining table 420, all NXX codes in the 304 NPA (e.g., 304-NXX) map to the area of West Virginia in the table.

In operation 530, the current TN pool index value is retrieved. Examining table 430, this value is set to 4. This value is used in operation 535 to then retrieve the $4^{th}$ number in the appropriate TN pool. Using table 430, the area of West Virginia is assigned to a pool of local numbers, namely $TN_{21}$, $TN_{22}$, $TN_{23}$, $TN_{24}$ . . . . Based on the index, the $4^{th}$ value is selected, which is $TN_{24}$. Referring to the illustrative values in the table 330 from FIG. 3 for exemplary values, the $4^{th}$ value is 304-598-1674. Thus, returning to FIG. 2, the call 232 is set up from the call center 250 to the Called Party B 215 using an ANI of 304-598-1674 as shown.

Additional Embodiments

The process flow of FIG. 5 represents only one potential embodiment. A number of variations from the above are possible. For example, different sized pools for each area could be defined all using the same index. If one of the tables reflects a pool of e.g., three numbers (which is less than the maximum value of the index), then an index value of 4 could result in counting in a round-robin fashion until the $4^{th}$ number is reached. Counting in a modulo 3 manner to the $4^{th}$ index value would identify the first number. Thus, the first number would be selected for index values of 1, 4, 7, 10, etc. Similarly, the second number in the pool list would be selected if the index were a value of 2, 5, 8, etc.

In other embodiments, the index value could be selected based on a date, day of week, by random selection using a random number generator, frequency distribution, or other algorithm. For example, the index could be set to 1 for Sunday, 2 for Monday, etc. In another embodiment, the index value could be derived from the current date. For example, if the date were the $25^{th}$ of the month, then the index value could be the sum of the digits, e.g., 2+5=7.

In another embodiment, the index value could be maintained on a per-called party basis. That is, for each called party, a separate index value counter may be maintained. This ensures that for each time a call is made to that called party, the index value is altered. Many other variations will come to mind to those skilled in the art in light of this disclosure as to how the ANI values could be selected from a local TN pool.

The area-to-TN pool mapping table 430 may be populated and maintained by the enterprise on whose behalf the call center is originating calls for. Specifically, the enterprise may obtain a set of local TNs for various areas and may be responsible for populating the table, and uploading the table to the call center or otherwise make the data available to the dialer 150. The call center may provide appropriate security mechanisms to allow the enterprise to upload a table of these numbers.

This allows the enterprise to replace the local numbers in the TN pool with new local numbers after a time period. For example, after a year of use, called parties who have been repeatedly called may begin to recognize or block the various local ANI numbers, making it difficult to contact the called party. Replacement or "refreshment' of the values in the TN pool avoids this problem. In one embodiment, the enterprise can upload a replacement data structure to replace the pool of telephone numbers.

If a called party does use the ANI to call back the call center, the local TN numbers can be forwarded to the call center, so that even though the number dialed is local, the calls are routed directly back to the call center. This avoids the called party from incurring long-distance charges.

In another embodiment, the call center may obtain and manage the table 430 of the TN pool. The call center may obtain a large set of numbers for each area, and allocate a subset as the TN pool for one enterprise, and then periodically allocate a new subset to each enterprise as a means to refresh the pool of local TNs. In other words, the call center can manage the local TN pools by swapping sets of local numbers. This allows the enterprise to avoid the responsibility of updating the pool numbers. Of course, when this is done, the forwarding of these numbers to the correct enterprise must also be coordinated.

In another embodiment, the call center may use the above procedures only in the context of a specific calling campaign. The call center may originate outbound calls for various enterprises, where the outbound calls associated with each enterprise are associated with a distinct calling campaign. A determination can be made by a processor in the dialer for a particular outgoing call, or for a list of outgoing calls, to determine on a campaign-by-campaign basis whether the substitution of the ANI should occur as described above. It is possible for each campaign to have allocated a distinct set of local ANI values to select from. It is possible for a campaign to originate outbound calls to certain states or locales, where calls to each locale is associated with a pool of local ANI telephone numbers, while another campaign does not use the above ANI scrambling procedures.

The call center may perform ANI scrambling on a batch basis, a per-call basis, or a combination thereof. In the batch basis, a list of records is compiled into a list file, which comprises records for outbound calls to be made by the dialer. The list file can include the list of outgoing telephone numbers to be dialed, and the appropriate ANI can be selected and included into the list file. Thereafter, when convenient, the dialer can then originate the outbound calls after the list is created by examining the records in the list file. The call is originated by the dialer using the ANI indicated in the record.

In another embodiment, the dialer may perform ANI scrambling on a per-call basis, where the ANI value to be selected is determined as the outbound call is being, or about to be, originated. The selection of the ANI on a per-call basis can be used in the scenario where the outbound call reaches a busy or no-answer condition for a user's primary telephone number, and a call is then originated to the user's secondary telephone number. The user's secondary telephone number may have a different NPA-NXX than the user's primary telephone number, and performing ANI scrambling on a per-call basis allows the procedures to be repeated when the secondary number is dialed. Another embodiment combines the process in a batch and per-call basis. For example, a list of outbound calls can be generated (which is a batch process) and only when the primary telephone number is unanswered is the ANI scrambling process invoked on a per-call basis when originating a call to the same user on their secondary telephone number. The determination of whether this occurs can be indicated using a flag that defines whether ANI scrambling should be applied to calls to the secondary telephone number.

Exemplary Computer Processing Device

Figure 6:
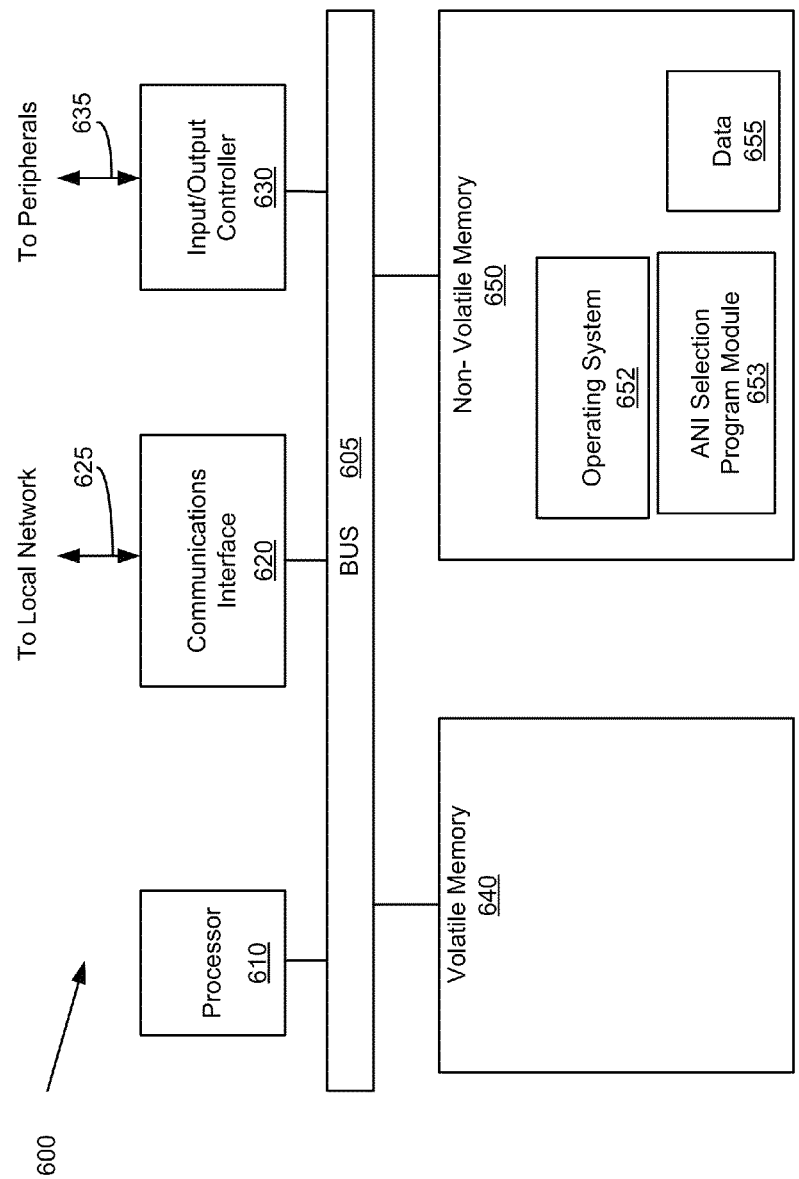
FIG. 6 is an exemplary schematic diagram of a server used in one embodiment of the call center architecture to practice the technologies disclosed herein.

As discussed in conjunction with FIG. 1, the call center architecture 100 may comprise various components, such as servers, that comprise a processing system. FIG. 6 is an exemplary schematic diagram of a computer processing system that may be used in an embodiment of the call center architecture to practice the technologies disclosed herein. FIG. 6 provides an exemplary schematic of a processing system 600, which could represent individually or in combination, for example, the ACD 130, CTI server 145, WFM server 155, agent computer 160*a*, or other components previously described. In general, the term "processing system" may be exemplified by, for example, but without limitation: a personal computer, server, desktop computer, tablets, smart phones, notebooks, laptops, distributed systems, servers, blades, gateways, switches, and the like, as well as any combination of devices or entities adapted to perform the functions described herein.

As shown in FIG. 6, the processing system 600 may include one or more processors 610 that may communicate with other elements within the processing system 600 via a bus 605. The processor 610 may be implemented as one or more complex programmable logic devices ("CPLD"), microprocessors, multi-core processors, digital signal processors ("DSP"), system-on-a-chip ("SOC"), co-processing entities, application-specific integrated circuits ("ASIC"), field programmable gate arrays ("FPGA"), programmable logic arrays ("PLA"), hardware accelerators, other circuitry, or the like.

In one embodiment, the processing system 600 may also include one or more communications interfaces 620 for communicating data via the local network 170 with various external devices, such as other servers of FIG. 1. In other embodiments, communication may be via wired, optical, or wireless networks (or a combination thereof). The communication may use a variety of data transmission protocols, such as fiber distributed data interface (FDDI), Ethernet, asynchronous transfer mode ("ATM"), or frame relay.

The input/output controller 630 may also communicate with one or more input devices or peripherals using an interface 635, such as, but not limited to: a keyboard, a mouse, a touch screen/display input, microphone, pointing device, etc. The input/output controller 630 may also communicate with output devices or peripherals, such as displays, printers, speakers, headsets, banner displays, etc.

The processor 610 may be configured to execute instructions stored in volatile memory 640, non-volatile memory 650, or other forms of computer readable storage media accessible to the processor 610. The volatile memory may comprise various types of memory technologies, including, but not limited to: random access memory ("RAM"), dynamic random access memory ("DRAM"), static random access memory ("SRAM"), and other forms well known to those skilled in the art. The non-volatile memory may comprise various technologies, including, but not limited to: storage media such as hard disks, floppy disks, read only memory ("ROM"), programmable read only memory ("PROM"), electrically erasable read only memory ("EPROM"), flash memory, and other forms well known to those skilled in the art.

The non-volatile memory 650 may store program code and data, which also may be loaded into the volatile memory 640 at execution time. Specifically, the non-volatile memory 650 may store one or more ANI selection program modules 653 and/or operating system code 652 containing instructions for performing the process and/or functions associated with the technologies disclosed herein. The ANI selection program module 653 may also access, generate, or store data 655 in the non-volatile memory 650, as well as in the volatile memory 640. The data 655 may include the above references tables and index values. The volatile memory and/or non-volatile memory may be used to store other information including, but not limited to: records, applications, programs, scripts, source code, object code, byte code, compiled code, interpreted code, machine code, executable instructions, or the like. These may be executed or processed by, for example, processor 610. These may form a part of, or may interact with, ANI selection program module 653.

The technologies described herein may be implemented in various ways, including as computer program products comprising memory storing instructions causing a processor to perform the operations associated with the above technologies. The computer program product may comprise a non-transitory computer readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms). Such non-transitory computer readable storage media include all the above identified computer readable media (including volatile and non-volatile media), but does not include a transitory, propagating signal. Non-volatile computer readable storage medium may specifically comprise: a floppy disk, flexible disk, hard disk, magnetic tape, compact disc read only memory ("CD-ROM"), compact disc compact disc-rewritable ("CD-RW"), digital versatile disc ("DVD"), Blu-Ray™ disc ("BD"), any other non-transitory optical medium, and/or the like. Non-volatile computer readable storage medium may also comprise read-only memory ("ROM"), programmable read-only memory ("PROM"), erasable programmable read-only memory ("EPROM"), electrically erasable programmable read-only memory ("EEPROM"), flash memory, and/or other technologies known to those skilled in the art.

CONCLUSION

Many modifications and other embodiments of the concepts and technologies set forth herein will come to mind to one skilled in the art having the benefit of the teachings presented in the foregoing descriptions and the associated drawings. Therefore, it is to be understood that embodiments other than the embodiments disclosed herein are intended to be included within the scope of the appended claims. Although specific terms may be employed herein, they are used in a generic and descriptive sense only and not for purposes of limitation.

The invention claimed is:

1. A system for selecting a calling party number for an outgoing call at a call center comprising:
a memory storing
a list comprising one or more called party telephone numbers, each comprising a NPA-NXX,
a first data structure configured to associate each NPA-NXX to one of a plurality of areas,
a second data structure configured to associate each of the one of the plurality of areas to a corresponding pool of telephone numbers from among a plurality of pools of local telephone numbers,
an index value, wherein the index value has a maximum value equal to a number of the telephone numbers in a specific pool and the index value is periodically incremented, decremented, or randomly determined; and
a processor configured to
receive a replacement data structure comprising replacement local telephone numbers to replace the local telephone numbers in the specific pool of local telephone numbers from among the plurality of pools;
retrieve a called party telephone number from the list of one or more called party telephone numbers,
use the NPA-NXX of the called party telephone number and the first data structure to determine a designated area associated with the called party telephone number from among the plurality of areas,
use the designated area and the second data structure to determine the specific pool of replacement local telephone numbers, the specific pool of replacement local telephone numbers associated with the designated area,
use the index value and the specific pool of replacement local telephone numbers to determine the calling party number for the outgoing call, and
generate the outgoing call using the calling party number.

2. The system of claim 1, wherein the processor is configured to increment the index value.

3. The system of claim 2, wherein the processor is configured to reset the index value to one after the index value reaches the maximum value.

4. A computer implemented method for selecting an ANI to use in an outbound call for a calling campaign from a call center, the method comprising:
receiving a data structure at the call center comprising a plurality of area designations wherein each area designation is associated with a corresponding pool of a plurality of local telephone numbers;
receiving a replacement data structure within a year from receiving the data structure:
retrieving a called party telephone number from a list of one or more telephone numbers;
determining an area code of the called party telephone number;
using the area code of the called party telephone number to ascertain an area designation;
using the area designation to identify a particular pool of local telephone numbers accessible by the call center from a plurality of pools of local telephone numbers, wherein the local telephone numbers in the particular pool have been replaced using the replacement data structure;
retrieving an index value stored in memory associated with the calling campaign, wherein the index value has a maximum value equal to a number of the local telephone numbers in the particular pool and the index value is periodically incremented, decremented, or randomly determined;
using the index value for selecting one of the local telephone numbers from the particular pool of local telephone numbers as the ANI; and originating the outbound call to a called party using the ANI.

5. The computer implemented method of claim 4, wherein the index value is incremented periodically.

6. The computer implemented method of claim 4, wherein the index value is incremented after the outbound call is originated with the ANI.

7. The computer implemented method of claim 4, wherein the index value is randomly determined.

8. The computer implemented method of claim 4, wherein the call center maintains the plurality of pools of local telephone numbers, where each one of the pools is allocated to an enterprise for which the call center originates calls.

9. A non-transitory computer readable storage medium having executable instructions stored thereon which when executed by a processor cause the processor to:
   receive a first data structure comprising a plurality of area designations wherein each area designation is associated with a corresponding pool of a plurality of local telephone numbers;
   receive a replacement data structure after receiving the first data structure, the replacement data structure comprising replacement local telephone numbers;
   retrieve a called party telephone number from a list of one or more telephone numbers stored in a data store wherein the list of one or more telephone numbers is associated with a calling campaign;
   determine an area code of the called party telephone number;
   use the area code of the called party telephone number to ascertain an area designation by retrieving a second data structure associating area designations with area codes;
   use the area designation to identify a particular pool of local telephone numbers stored in a memory, wherein the local telephone numbers in the particular pool have been replaced with the replacement local telephone numbers;
   retrieve an index value stored in a memory associated with the calling campaign, wherein the index value has a maximum value equal to a number of the local telephone numbers in the particular pool and the index value is periodically incremented, decremented, or randomly determined;
   use the index value for selecting one of the local telephone numbers from the particular pool of local telephone numbers as an ANI; and
   originate a call to a called party using the ANI wherein the call is associated with the calling campaign.

10. The non-transitory computer readable storage medium of claim 9, wherein the index value is determined using a random number generator.

11. The non-transitory computer readable storage medium of claim 9, wherein the index value is incremented periodically.

12. The non-transitory computer readable storage medium of claim 9, wherein the index value is incremented after the call is originated.

13. The non-transitory computer readable storage medium of claim 9, wherein a call center maintains a plurality of pools of local telephone numbers, where each one of the pools is allocated to an enterprise for which the call center originates calls.

* * * * *